(12) United States Patent
Pophale

(10) Patent No.: US 11,029,846 B1
(45) Date of Patent: Jun. 8, 2021

(54) METHOD AND APPARATUS FOR A DYNAMIC SEARCH KEYBOARD

(71) Applicant: Charter Communications Operating, LLC, St. Louis, MO (US)

(72) Inventor: Yogesh Govind Pophale, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/940,799

(22) Filed: Jul. 28, 2020

(51) Int. Cl.
  *G06F 3/048* (2013.01)
  *G06F 3/0488* (2013.01)
(52) U.S. Cl.
  CPC ................... *G06F 3/04886* (2013.01)
(58) Field of Classification Search
  CPC .................................................. G06F 3/04886
  See application file for complete search history.

(56) References Cited

U.S. PATENT DOCUMENTS

| | | | | |
|---|---|---|---|---|
| 2004/0021681 A1* | 2/2004 | Liao | ...................... | G06F 1/1616 715/702 |
| 2015/0040055 A1* | 2/2015 | Zhao | ...................... | G06F 40/274 715/773 |
| 2015/0293694 A1* | 10/2015 | Bozzini | .................. | G06F 3/0482 715/773 |
| 2016/0202904 A1 | 7/2016 | Huang et al. | | |
| 2019/0369869 A1* | 12/2019 | Dobryniewski | ... | H04N 21/4312 |

FOREIGN PATENT DOCUMENTS

EP    1356368 B1    12/2007

* cited by examiner

*Primary Examiner* — David E Choi
(74) *Attorney, Agent, or Firm* — Young Basile Hanlon & MacFarlane, P.C.

(57) ABSTRACT

Disclosed herein are methods and apparatus for content searching using a dynamic search keyboard. A method for searching for content includes displaying, on a display device, a search page including at least a dynamic search keyboard and a search bar. A character is selected on the dynamic search keyboard using a remote control device. The selected character is displayed on the search bar. The dynamic search keyboard is reconfigured using the selected character as the focus and relevant characters are positioned proximate to the selected character based on search algorithm analysis. The reconfigured dynamic search keyboard is displayed. The character selection and dynamic search keyboard reconfiguration are repeated until an exit action.

18 Claims, 8 Drawing Sheets

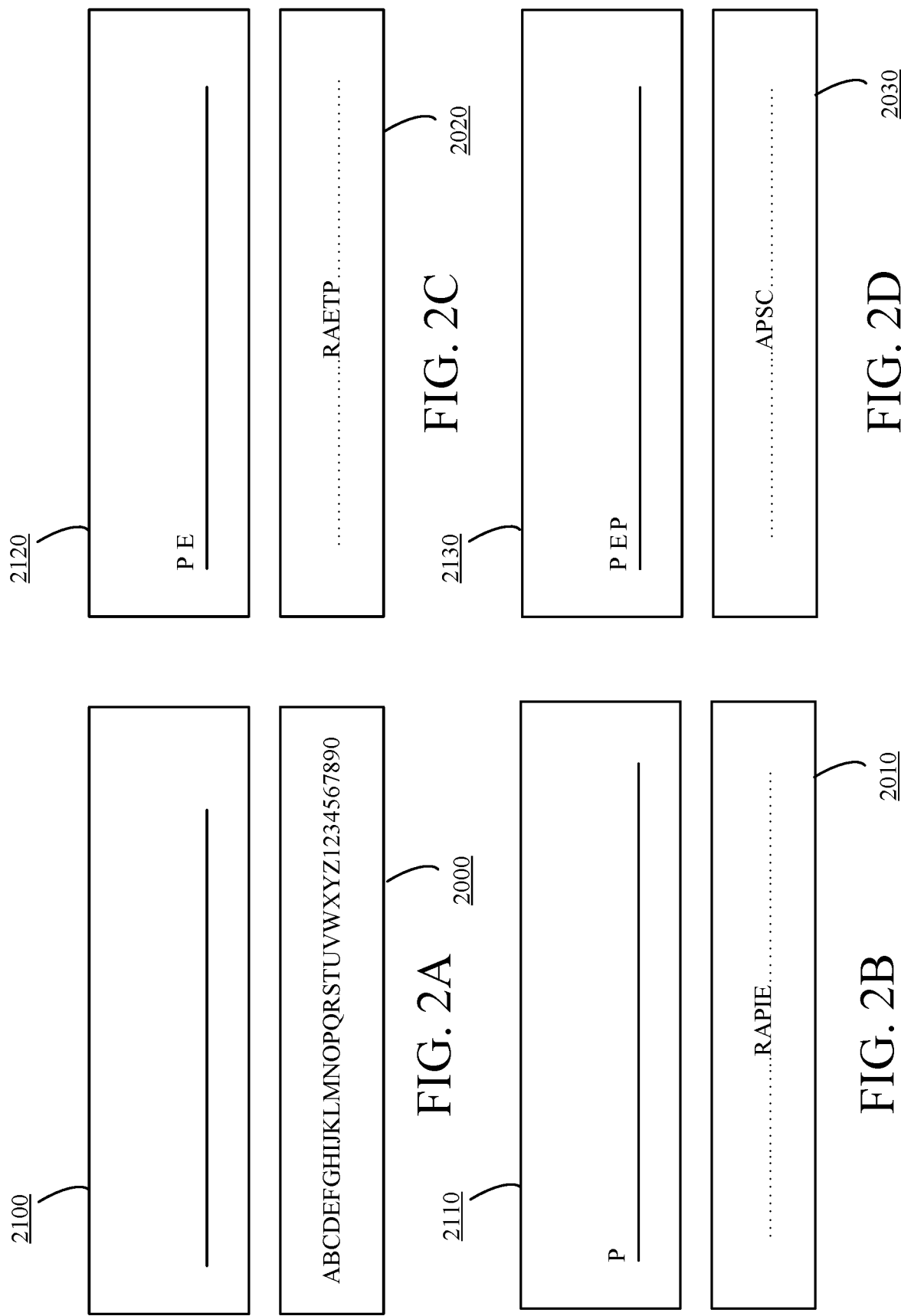

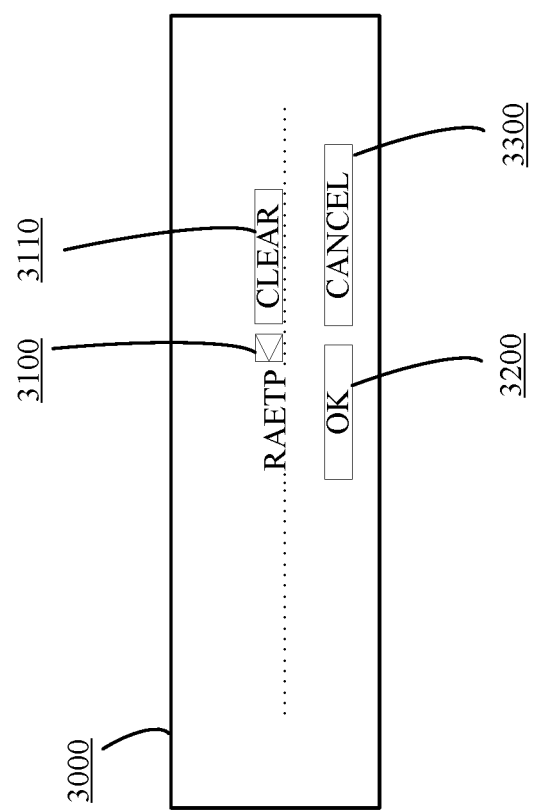

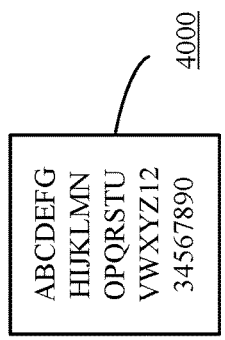
FIG. 4A
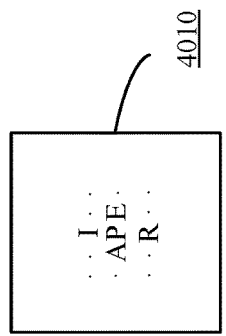
FIG. 4B
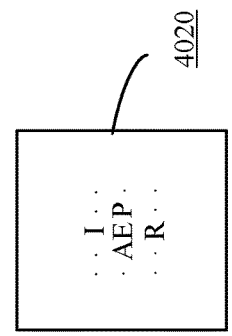
FIG. 4C
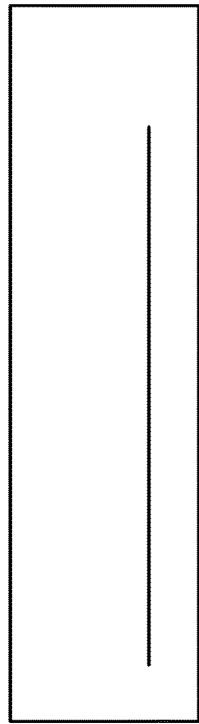
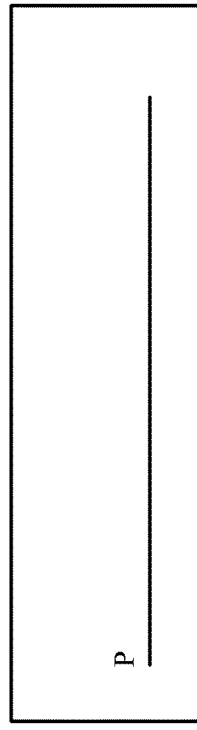
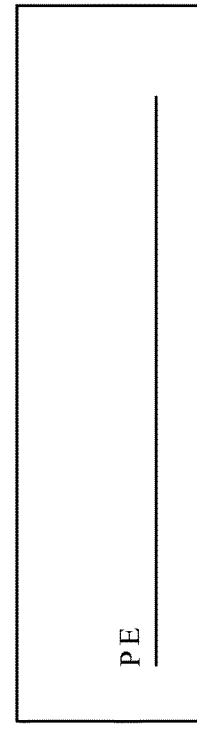

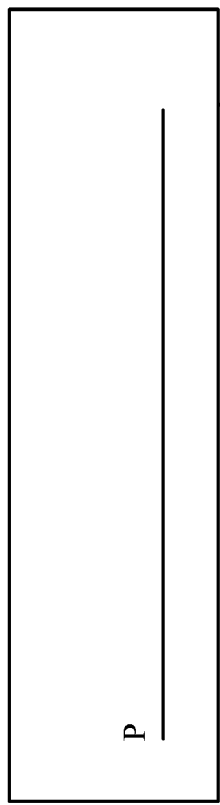
FIG. 6A
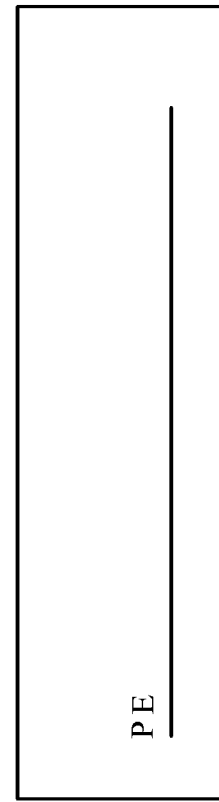
FIG. 6B
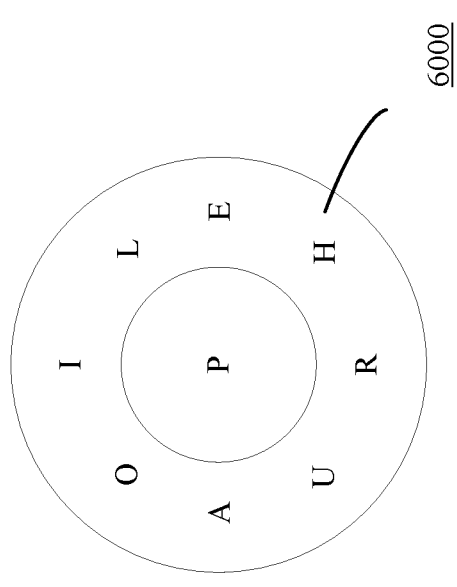
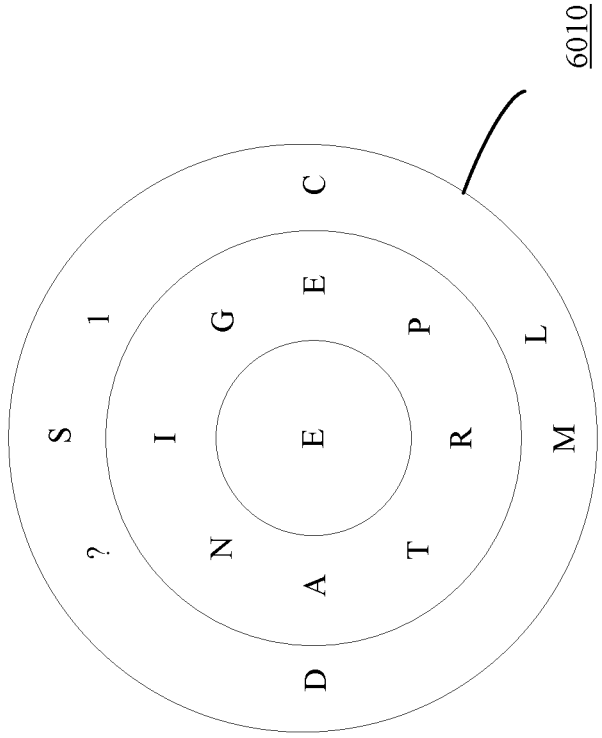

METHOD AND APPARATUS FOR A DYNAMIC SEARCH KEYBOARD

TECHNICAL FIELD

This disclosure relates to searching for content using a remote control device. More specifically, this disclosure relates to searching for content using a dynamic search keyboard in collaboration with the remote control device.

BACKGROUND

Users find content to watch or listen by using a remote control to select characters displayed on a television or other display device. Selection of a particular character is accomplished by moving around on a displayed static keyboard using a combination of the left, right, up, and down control buttons on the remote control device. Searching for content using the remote control device by using the control buttons is clumsy, inefficient, and frustrating. It can take an inordinate number of keystrokes to find the content in question.

SUMMARY

Disclosed herein are methods and apparatus for a dynamic search keyboard.

In implementations, a method for searching for content includes displaying, on a display device, a search page including at least a dynamic search keyboard and a search bar. A character is selected on the dynamic search keyboard using a remote control device. The selected character is displayed on the search bar. The dynamic search keyboard is reconfigured using the selected character as the focus and relevant characters are positioned proximate to the selected character based on search algorithm analysis. The reconfigured dynamic search keyboard is displayed. The character selection and dynamic search keyboard reconfiguration are repeated until an exit action.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIGS. 2A-2D are diagrams of an example dynamic search keyboard in accordance with embodiments of this disclosure.

FIG. 3 is a diagram of an example dynamic search keyboard in accordance with embodiments of this disclosure.

FIGS. 4A-4C are diagrams of an example dynamic search keyboard in accordance with embodiments of this disclosure.

FIGS. 6A-6B are diagrams of an example dynamic search keyboard in accordance with embodiments of this disclosure.

DETAILED DESCRIPTION

Figure 1:
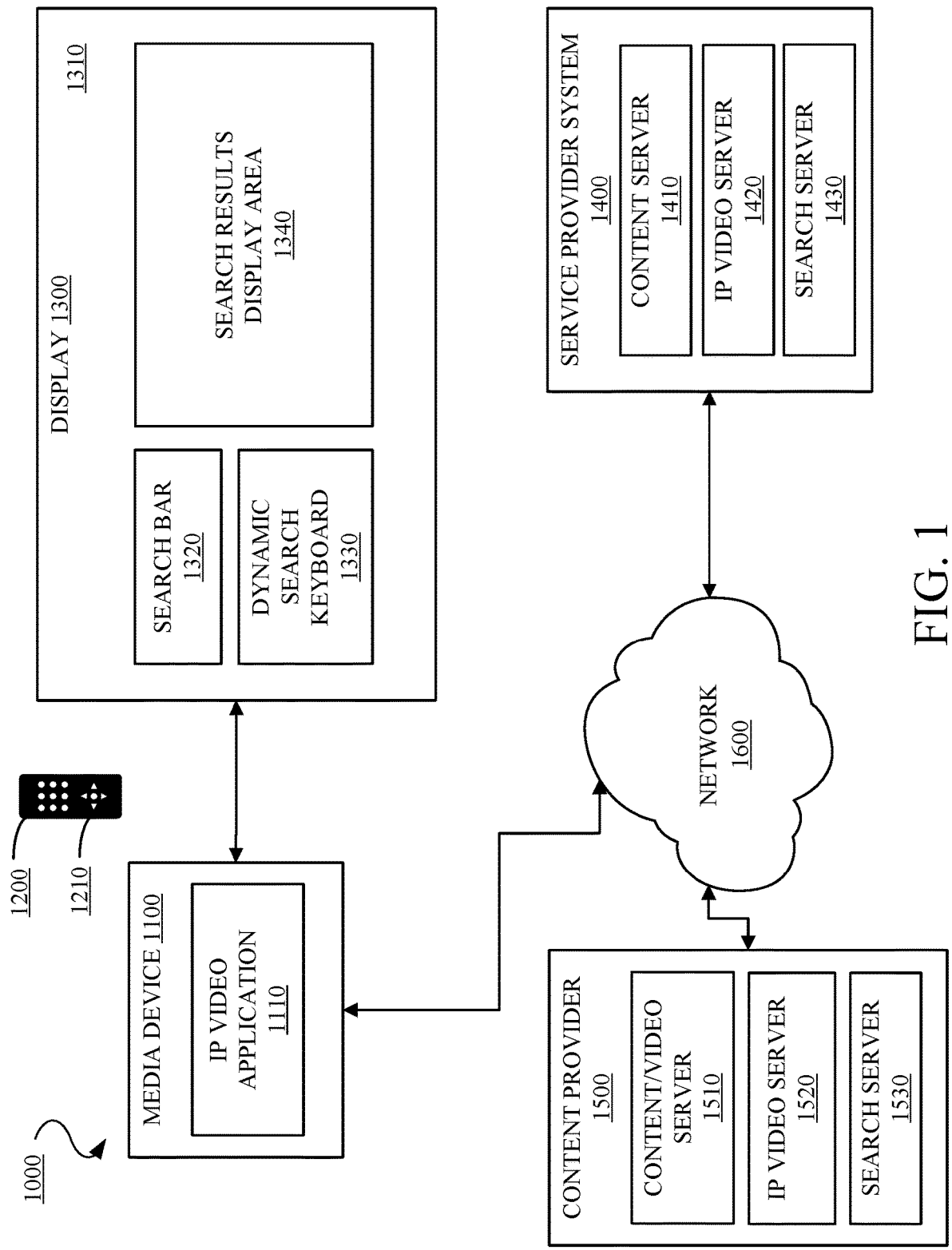
FIG. 1 is a diagram of an example architecture of a network in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, streaming, Internet Protocol (IP) video, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein are methods and apparatus for dynamic search keyboards. A mechanism is provided where a keyboard is dynamically configured or updated based on selection of a character on the keyboard. For example, the keyboard can have characters or keys including, but not limited to, alphanumeric characters, special characters, clear key, backspace key, OK key, cancel key, and the like. A static search keyboard is replaced with a dynamic search keyboard where relevant characters are provided proximate to the selected character. The dynamic search keyboard alleviates the cumbersome navigation using the static search keyboard by placing the most relevant next characters at a minimal keystroke distance or count from the selected character. Consequently, the dynamic search keyboard is an easy, relatable, and intuitive way for the user to navigate a content search.

In implementations, the mechanism can utilize search results from content providers, service providers, or combinations thereof (collectively "content providers" as appropriate and applicable) to populate the dynamic search keyboard. In implementations, the mechanism can use a number of parameters, including but not limited to, a language dictionary, common titles, new releases, most frequent titles viewed by the user, time based tendencies, or combinations thereof, viewing history, search patterns, location based tendencies, most used genre, trending data, and/or combinations thereof. The mechanism provides input from a search algorithm to intelligently configure the search keyboard.

In implementations, the dynamic search keyboard can be a linear keyboard having the relevant characters on either side of the selected character. In implementations, the dynamic search keyboard can be rectangular with the relevant characters on all sides of the selected character. In implementations, the dynamic search keyboard can be circular with the relevant characters surrounding the selected character. In implementations, multiple circles of characters can be displayed. In implementations, a backspace character can be placed relative to the populated relevant character to enable replacement of the relevant character with another relevant character.

FIG. 1 is a diagram of an example network, architecture, or system 1000 for a dynamic search keyboard in accordance with embodiments of this disclosure. In an implementation, the system 1000 can include a media device 1100 connected to or in communication with (collectively "connected to") a remote control 1200 and a display 1300. The media device 1100 is also connected to a service provider system 1400 and a content provider 1500 via a network 1600. The connections between the media device 1100, the remote control 1200, the display 1300, the service provider system 1400 and the content provider 1500 can be wired, wireless or combinations thereof. In an implementation, the system 2000 may execute the techniques described in FIG. 8. The network system and the components therein may include other elements which may be desirable or necessary to implement the devices, systems, compositions, and methods described herein. However, because such elements and steps are well known in the art, and because they do not facilitate a better understanding of the disclosed embodiments, a discussion of such elements and steps may not be provided herein.

The media device 1100 can be, but is not limited to, end user devices, set top boxes, content/media receivers, media appliances, information appliances, gateways, Internet Protocol (IP) devices, mobile computers, laptops, handheld computers, personal media devices, smartphones, notebooks, notepads, phablets and the like. For example, in an implementation, the media device 1100 may include, but not limited to, an IP video application 1110 and the like.

The remote control 1200 can be, but is not limited to, an infrared device, a wireless device, a BlueTooth device, and the like which can control the media device 1100, the display 1300, or both. The remote control 1200 can include directional or navigational buttons 1210 for moving a cursor on the display 1300, for example.

The display 1300 can be, but is not limited to, a television, a monitor, a smart television, a smart monitor, and the like. The display 1300 can be driven to present a home page, a search page, content, content guide, content information, and the like. In implementations, a search page 1310 can include, but is not limited to, a search bar 1320, a dynamic search keyboard 1330, a search results display area 1340, and the like. The search bar 1320 can present the characters selected by the user on an on-going basis. The dynamic search keyboard 1330 is a dynamic, configurable keyboard based on character selection and relevant characters provided by a search algorithm analysis and determination. The selected character can be centrally positioned and the relevant characters can be positioned proximate to the selected character to minimize keystrokes. The dynamic search keyboard 1330 can be any shape including, but not limited to, linear, rectangular, circular, and the like. The dynamic search keyboard 1330 can be in the same plane as the search page 1310 or can be a pop-up window. The search results display area 1340 can show potential titles of content based on the current character selections. Selections on the display 1300 and the dynamic search keyboard 1330 via the remote control device 1200 can be sent to the service provider system 1400, the search server 1430, the content provider 1500, a search server 1530, or combinations thereof.

The service provider system 1400 can provide connectivity and content to the media device 1100 from a content server 1410 or via the content provider 1500. The service provider system 1400 may include, but is not limited to, the content server 1410, an IP video application server 1420, and a search server 1430. In an implementation, the content server 1410, the IP video application server 1420, and the search server 1430 can be an integrated server or element. The content server 1410 can include content for distribution or streaming to the media device 1100. In implementations, the content can be indexed based on a variety of parameters including, but not limited to, titles, actresses, actors, directors, genre, and the like. The IP video application server 1420 can communicate with the IP video application 1110 on the media device 1100. In an implementation, the communication may be via an IP network in the network 1600. The communication may include content and control data. In an implementation, the control data may include, but is not limited to, search parameters, search selections, character selections, and the like. The search server 1430 can use a variety of parameters and the content index to determine the relevant characters for configuration and presentation for the dynamic search keyboard 1330 after selection of a character by a user. For example, the parameters can include, but is not limited to, historical patterns, genre, time, location, date, trends, release date, ratings, reviews, user centric information or profile, and the like. In implementations, the search server 1430 can use machine learning techniques to learn based on character selection and content selection.

The content provider 1500 can provide content to the media device 1100 via the network 1600 and/or the service provider system 1400. The content provider 1500 can include, but is not limited to, the content or video server 1510, an IP video server 1520, and the search server 1530. In an implementation, the content server 1510, the IP video application server 1520, and the search server 1530 can be an integrated server or element. The content server 1510 can include content for distribution or streaming to the media device 1100. In implementations, the content can be indexed based on a variety of parameters including, but not limited to, titles, actresses, actors, directors, genre, and the like. The IP video application server 1520 can communicate with the IP video application 1110 on the media device 1100. In an implementation, the communication may be via an IP network in the network 1600. Communication between the relevant elements can include content and control data. In an implementation, the control data may include, but is not limited to, search parameters, search selections, character selections, and the like. The search server 1530 can use a variety of parameters and the content index to determine the relevant characters for configuration and presentation for the dynamic search keyboard 1330 after selection of a character by a user. For example, the parameters can include, but is not limited to, historical patterns, genre, time, location, date, trends, release date, ratings, reviews, user centric information or profile, and the like. In implementations, the search server 1530 can use machine learning techniques to learn based on character selection and content selection.

The network 1600 may be and may include, but is not limited to, the Internet, an intranet, a local area network (LAN), a wide area network (WAN), a public network, a private network, a cellular network, a WiFi-based network, a telephone network, a landline network, public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, an IP network, cable, satellite, hybrid coaxial systems, fiberoptic systems, and like including any combinations thereof. In an implementation, the network 1600 may contain one or more servers, network elements or devices, and the like.

An overview description is provided for FIGS. 2A-2D, 3, 4A-4C, 5, and 6A-6B to support the operational description with respect to FIGS. 1, 2A-2D, 3, 4A-4C, 5, and 6A-6B.

FIGS. 2A-2D are diagrams of an example dynamic search keyboard in a linear format in accordance with embodiments of this disclosure. FIG. 2A is an example dynamic search keyboard 2000 in an initial state and with a search bar 2100 with no selected characters. FIG. 2B is an example dynamic search keyboard 2010 and a search bar 2110 after selection of the character "P". FIG. 2C is an example dynamic search keyboard 2020 and a search bar 2120 after selection of the character "E". FIG. 2D is an example dynamic search keyboard 2030 and a search bar 2130 after selection of the character "P". FIG. 3 is a diagram of an example dynamic search keyboard 3000 in a linear format with backspace and clear functionality in accordance with embodiments of this disclosure.

Figure 5:
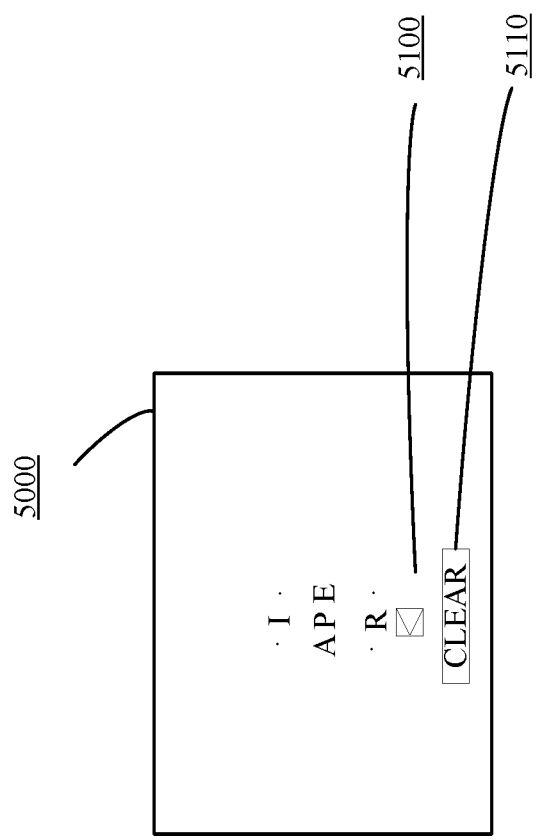
FIG. 5 is a diagram of an example dynamic search keyboard in accordance with embodiments of this disclosure.

FIGS. 4A-4C are diagrams of an example dynamic search keyboard in a rectangular format in accordance with embodiments of this disclosure. FIG. 4A is an example dynamic search keyboard 4000 in an initial state and with a search bar 4100 with no selected characters. FIG. 4B is an example dynamic search keyboard 4010 and a search bar 4110 after selection of the character "P". FIG. 4C is an example dynamic search keyboard 4020 and a search bar 4120 after selection of the character "E". FIG. 5 is a diagram of an example dynamic search keyboard 5000 in a rectangular format with backspace and clear functionality in accordance with embodiments of this disclosure.

FIGS. 6A and 6B are diagrams of an example dynamic search keyboard in a circular format in accordance with embodiments of this disclosure. FIG. 6A is an example dynamic search keyboard 6000 and a search bar 6100 after selection of the character "P". FIG. 6B is an example dynamic search keyboard 6010 and a search bar 6110 after selection of the character "E".

Operationally, with reference to FIGS. 1, 2A-2D, 3, 4A-4C, 5, and 6A-6B, a user can initiate a search for content by selecting or clicking on a character on the dynamic search keyboard 1330 on the search page 1310 using the remote control unit 1200. For purposes of illustration, the user is searching for content having the title "PEPPA PIG" with respect to the description herein below. In response to the character selection, the selected character is presented in the search bar 1320. The search server 1430 or the search server 1530, as appropriate, can determine the most relevant characters for the dynamic search keyboard based on search parameters including, but not limited to, historical patterns, genre, time, location, date, trends, release date, ratings, reviews, user centric information or profile, and the like. In implementations, an ordered list of characters can be determined which includes all characters available on the dynamic search keyboard 1330. In implementations, the number of characters presented on the dynamic search keyboard 1330 is selectable.

The dynamic search keyboard 1330 can be configured to present the selected character in a central position. The identified relevant characters can be positioned proximate to the selected character to minimize keyboard strokes. Less relevant characters are positioned further away from the selected character. In implementations, a backspace or clear function key can be presented so that the user can delete the selected character. In this instance, the dynamic search keyboard 1330 can return to a previous configuration. The user can repeat character selection until a desired content is presented in the search results display area 1340. The search bar 1320 can present the sequence of selected characters. The dynamic search keyboard 1330 can reconfigure after each character selection. In implementations, the user can exit the search page by selecting a content in the search results display area 1340. In implementations, one or more of a cancel function key, exit function key, and return function key can be presented so that the user can start over at the initial configuration of the dynamic search keyboard 1330 or return to a home page.

As stated, FIGS. 2A-2D are diagrams of an example dynamic search keyboard in a linear format in accordance with embodiments of this disclosure. In an initial configuration, the user can see the dynamic search keyboard 2000 in a standard or initial configuration and an empty search bar 2100 with no selected characters. Once the user selects the character "P", the search bar 2110 can show the character "P" and the dynamic search keyboard 2010 can show the selected character "P" and the relevant characters or the list of ordered characters as identified by the search server. After selection of a second character "E", the search bar 2120 can show the characters "PE" and the dynamic search keyboard 2020 can be configured to show the relevant characters or the list of ordered characters as identified by the search server. After selection of a third character "P", the search bar 2130 can show the characters "PEP" and the dynamic search keyboard 2030 can be configured to show the relevant characters or the list of ordered characters as identified by the search server. In the event that the user needs to return to an earlier presented dynamic search keyboard, a backspace 3100 and/or clear functionality 3110 can be presented in the dynamic search keyboard 3000. In implementations, the backspace 3100 and/or clear functionality 3110 can be within a minimum keystroke distance from the relevant characters. In implementations, an OK functional key 3200 can be presented to process the selected character. In implementations, a cancel functional key 3300 can be presented to return to a home page or restart the content search.

As stated, FIGS. 4A-4C are diagrams of an example dynamic search keyboard in a rectangular format in accordance with embodiments of this disclosure. In an initial configuration, the user can see the dynamic search keyboard 4000 in a standard or initial configuration and an empty search bar 4100 with no selected characters. Once the user selects the character "P", the search bar 4110 can show the character "P" and the dynamic search keyboard 4010 can show the selected character "P" and the relevant characters or the list of ordered characters as identified by the search server. In this instance, the most relevant characters can be positioned nearest to the selected character. In implementations, remaining or less relevant characters can be positioned further away from the selected character. After selection of a second character "E", the search bar 4120 can show the characters "PE" and the dynamic search keyboard 4020 can be configured to show the relevant characters or the list of ordered characters as identified by the search server. In the event that the user needs to return to an earlier dynamic search keyboard, a backspace 5100 and/or clear functionality 5110 can be presented in the dynamic search keyboard 5000. In implementations, the backspace 5100 and/or clear functionality 5110 can be within a minimum keystroke distance from the relevant characters. In implementations, a cancel functional key can be presented to return to a home page or restart the content search. In implementations, an OK functional key can be presented to process the selected character.

As stated, FIGS. 6A and 6B are diagrams of an example dynamic search keyboard in a circular format in accordance with embodiments of this disclosure. After a first character selection, the search bar 6100 can show the character "P" and the dynamic search keyboard 6000 can show the selected character "P" and the relevant characters or the list of ordered characters as identified by the search server. After a second character selection, the search bar 6110 can show the characters "PE" and the dynamic search keyboard 6010 can show the selected character "E" and the relevant characters or the list of ordered characters as identified by the search server. Each outer circle can show less relevant characters. In the event that the user needs to return to an earlier dynamic search keyboard, a backspace or clear functionality can be presented in the dynamic search keyboard 6000. In implementations, a cancel or clear functional key can be presented to return to a home page or restart the content search. In implementations, an OK functional key can be presented to process the selected character.

Figure 7:
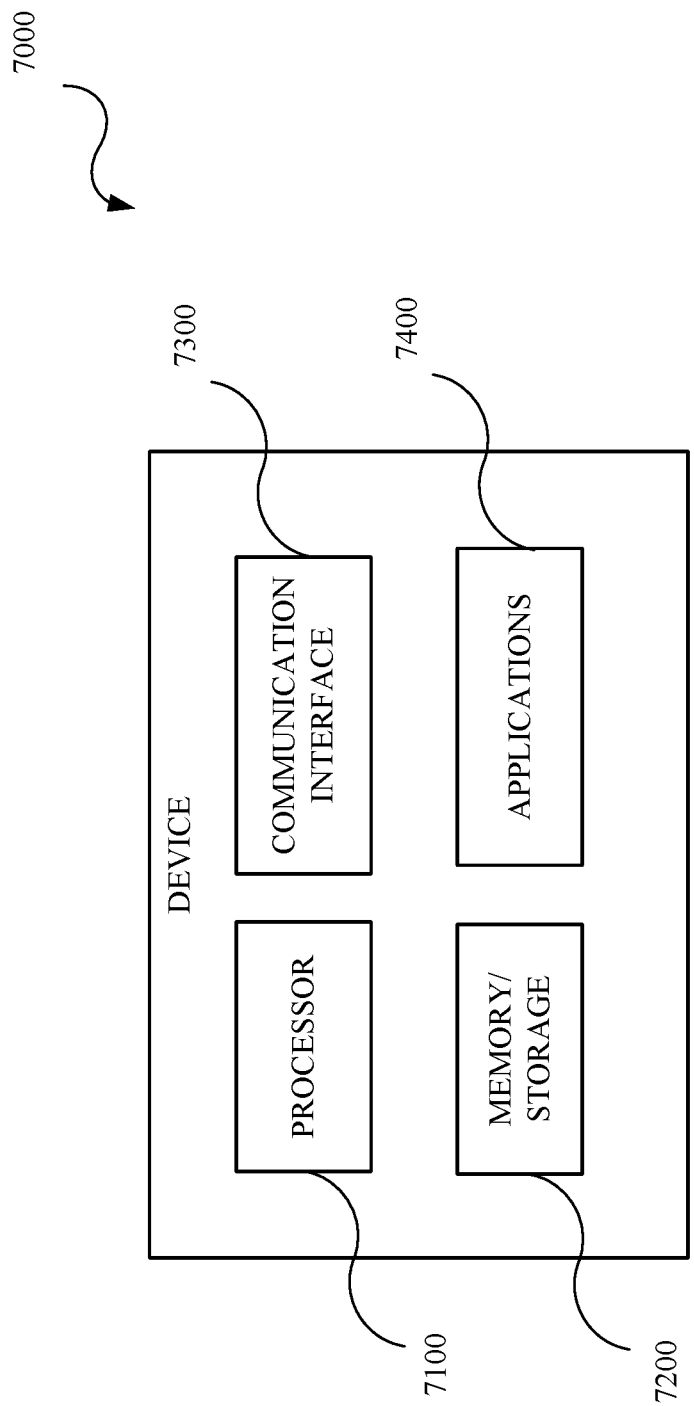
FIG. 7 is a diagram of an example device in accordance with embodiments of this disclosure.

FIG. 7 is a block diagram of an example of a device 7000 in accordance with embodiments of this disclosure. The device 7000 may include, but is not limited to, a processor 7100, a memory/storage 7200, a communication interface 7300, and applications 7400. The device 7000 may include or implement, for example, the media device 1100, the display 1300, elements of the service provider system 1400, the content server 1410, the IP video application server 1420, the search server 1430, elements of the content provider 1500, the content server 1510, the IP video application server 1520, and the search server 1530. In an implementation, the memory/storage 7200 may store the name of content, content index, selected characters, relevant character, and the like. The search, selection, and update techniques or methods described herein may be stored in the memory/storage 7200 and executed by the processor 7100 in cooperation with the memory/storage 7200, the communications interface 7300, and applications 7400, as appropriate. The device 7000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 8:
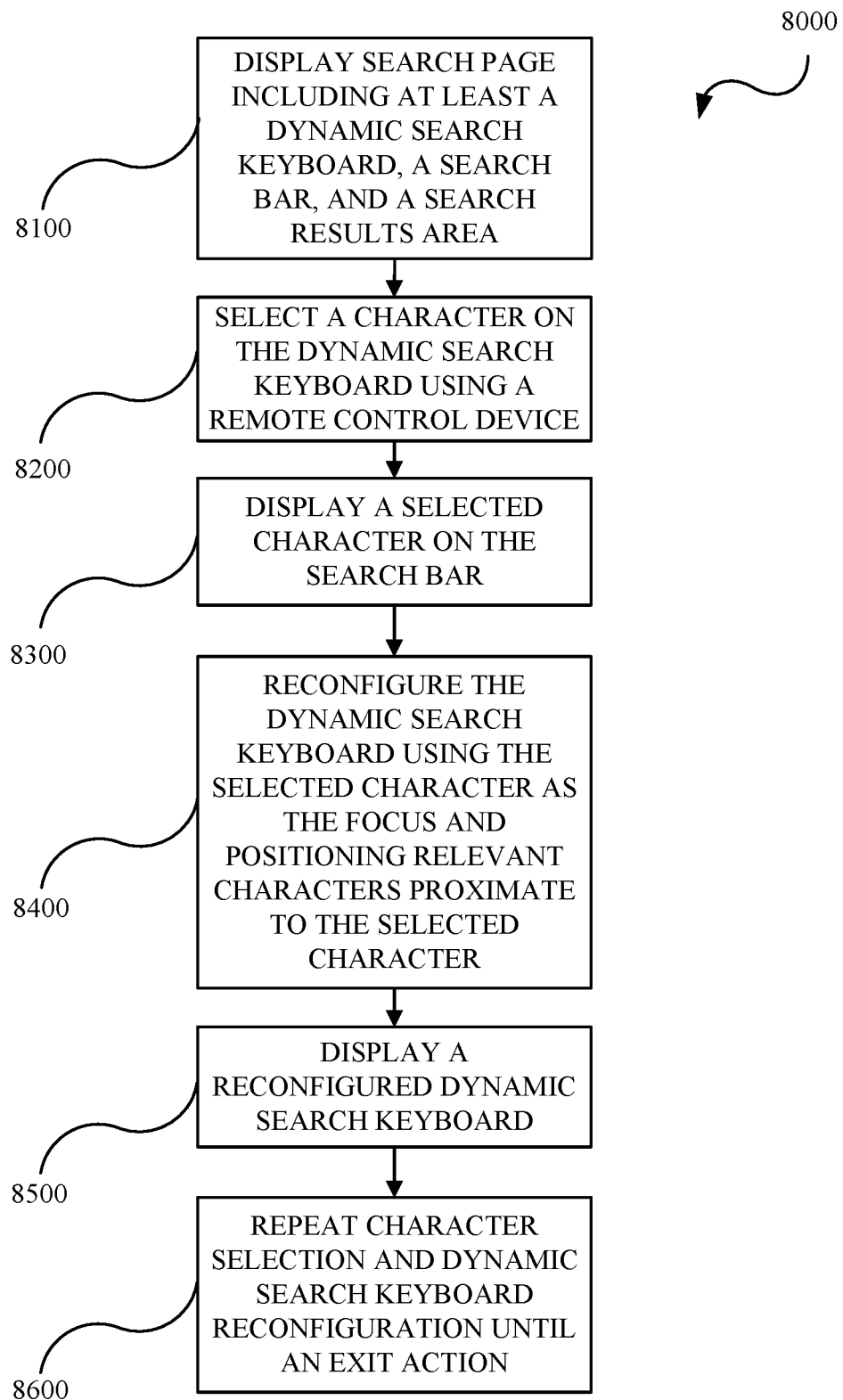
FIG. 8 is a flowchart of an example method for implementing a dynamic search keyword in accordance with embodiments of this disclosure.

FIG. 8 is a flowchart of an example method 8000 in accordance with embodiments of this disclosure. The method 8000 includes: displaying 8100 a search page including at least a dynamic search keyboard, a search bar, and a search results area, selecting 8200 a character on the dynamic search keyboard using a remote control device; displaying 8300 a selected character on the search bar; reconfiguring 8400 the dynamic search keyboard using the selected character as the focus and positioning relevant characters proximate to the selected character; displaying 8500 a reconfigured dynamic search keyboard; and repeating 8600 character selection and dynamic search keyboard reconfiguration until an exit action. For example, the technique 8000 may be implemented, as applicable and appropriate, by the media device 1100, the display 1300, elements of the service provider system 1400, the content server 1410, the IP video application server 1420, the search server 1430, elements of the content provider 1500, the content server 1510, the IP video application server 1520, the search server 1530, the processor 7100, the memory/storage 7200, the communication interface 7300, and the applications 7400.

The method 8000 includes displaying 8100 a search page including at least a dynamic search keyboard, a search bar, and a search results area. Users can search for content on a service provider system or other content providers by going to a search page.

The method 8000 includes selecting 8200 a character on the dynamic search keyboard using a remote control device. The user can select any character on the dynamic search keyboard using the directional control buttons or other control buttons on the remote control device.

The method 8000 includes displaying 8300 a selected character on the search bar. The search bar can display the selected character. Upon multiple character selections, the search bar can display the sequence of selected characters.

The method 8000 includes reconfiguring 8400 the dynamic search keyboard using the selected character as the focus and positioning relevant characters proximate to the selected character. The dynamic search keyboard minimizes the number of keystrokes between the selected character and a next selection by placing the most relevant characters closer to the selected character. Relevant character determination can be done by the search servers or algorithms of the content providers or the service providers. In implementations, the relevant character determination can be provided as an application provisioned on the media device which can interact with the provider of the content.

The method 8000 includes displaying 8500 a reconfigured dynamic search keyboard. The reconfigured dynamic search keyboard can be displayed or presented to the user. In implementations, the reconfigured dynamic search keyboard can be a pop-up window.

The method 8000 includes repeating 8600 character selection and dynamic search keyboard reconfiguration until an exit action. In implementations, the exit action can be selection of content displayed in the search results area. In implementations, the exit action can be cancellation of the search. In implementations, the exit action can be a return to a previous dynamic search keyboard due to a backspace or clear entry.

In general, a method for searching for content includes displaying, on a display device, a search page including at least a dynamic search keyboard and a search bar, selecting a character on the dynamic search keyboard using a remote control device, displaying a selected character on the search bar, reconfiguring the dynamic search keyboard using the selected character as the focus and positioning relevant characters proximate to the selected character, displaying a reconfigured dynamic search keyboard, and repeating character selection and dynamic search keyboard reconfiguration until an exit action. In implementations, the method further including determining, by a search server, the relevant characters based on historical patterns, genre, time, location, date, trends, release date, ratings, reviews, and user centric information or profile. In implementations, how many relevant characters are displayed is configurable. In implementations, the relevant characters with a higher probability are positioned a minimal keystroke distance from the selected character. In implementations, the relevant characters with a lower probability are positioned further keystroke distances away from the selected character. In implementations, the method further including positioning a backspace key a minimal keystroke distance from the relevant characters. In implementations, the method further including returning to a previous reconfigured dynamic search keyboard upon the user deleting a selected character using the backspace key. In implementations, the method further including positioning a clear key a minimal keystroke distance from the relevant characters. In implementations, the exit action is selection of content displayed in a search results area based on character selection.

In general, a system includes a display device, a search engine in communication with the display device, and a remote control unit configured to control the display device. The display device configured to present, in response to a user input on the remote control unit, a search page including at least a dynamic keyboard and a search bar, present, in response to the user selecting a character on the dynamic keyboard using the remote control unit, a selected character on the search bar, present, in response to the user selecting the character on the dynamic keyboard using the remote control unit and in response to determination of next selectable characters from the search engine, a reconfigured dynamic search keyboard with the selected character in a central position and the next selectable characters proximate to the selected character. In implementations, how many next selectable characters are displayed is configurable. In implementations, the next selectable characters with a higher likelihood of selection are positioned a minimal keystroke distance from the selected character. In implementations, the next selectable characters with a lower likelihood of selection are positioned further keystroke distances away from the selected character. In implementations, a delete key is positioned and presented a minimal keystroke distance from the next selectable characters. In implementations, the display device configured to present, in response to the user deleting a selected character, a previous reconfigured dynamic keyboard.

In general, a method for searching content using a configurable keyboard including selecting, via a remote control device, a character on a configurable keyboard displayed on a monitor, configuring the configurable keyboard around a selected character, configuring the configurable keyboard with ordered selectable characters, wherein higher ordered selectable characters are minimal keystrokes from the selected character, and displaying the configurable keyboard on the monitor for a next character selection. In implementations, the method further including determining, by at least one of a service provider and a content provider, the ordered selectable characters based on historical patterns, genre, time, location, date, trends, release date, ratings, reviews, and user centric information or profile. In implementations, how many ordered selectable characters are displayed is configurable. In implementations, the method further including positioning a backspace key a minimal keystroke distance from the ordered selectable characters. In implementations, the method further including returning to a previous presented configurable keyboard upon deletion of a selected character using the backspace key.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for searching for content, the method comprising:

displaying, on a display device, a search page including at least a dynamic search keyboard and a search bar;
selecting a character on the dynamic search keyboard using a remote control device;
displaying a selected character on the search bar;
reconfiguring the dynamic search keyboard using the selected character as the focus and positioning relevant characters proximate to the selected character;
positioning a backspace key a minimal keystroke distance from the relevant characters;
displaying a reconfigured dynamic search keyboard; and
repeating character selection and dynamic search keyboard reconfiguration until an exit action.

2. The method of claim 1, further comprising:
determining, by a search server, the relevant characters based on historical patterns, genre, time, location, date, trends, release date, ratings, reviews, and user centric information or profile.

3. The method of claim 1, wherein how many relevant characters are displayed is configurable.

4. The method of claim 3, wherein the relevant characters with a higher probability are positioned a minimal keystroke distance from the selected character.

5. The method of claim 4, wherein the relevant characters with a lower probability are positioned further keystroke distances away from the selected character.

6. The method of claim 1, further comprising:
returning to a previous reconfigured dynamic search keyboard upon the user deleting a selected character using the backspace key.

7. The method of claim 1, further comprising:
positioning a clear key a minimal keystroke distance from the relevant characters.

8. The method of claim 1, wherein the exit action is selection of content displayed in a search results area based on character selection.

9. A system comprising:
a display device;
a search engine in communication with the display device; and
a remote control unit configured to control the display device,
the display device configured to:
present, in response to a user input on the remote control unit, a search page including at least a dynamic keyboard and a search bar;
present, in response to the user selecting a character on the dynamic keyboard using the remote control unit, a selected character on the search bar;
present, in response to the user selecting the character on the dynamic keyboard using the remote control unit and in response to determination of next selectable characters from the search engine, a reconfigured dynamic search keyboard with the selected character in a central position the next selectable characters proximate to the selected character, a delete key a minimal keystroke distance from the next selectable characters, and a clear key a minimal keystroke distance from the next selectable characters.

10. The system of claim 9, wherein how many next selectable characters are displayed is configurable.

11. The system of claim 9, wherein the next selectable characters with a higher likelihood of selection are positioned a minimal keystroke distance from the selected character.

12. The system of claim 11, wherein the next selectable characters with a lower likelihood of selection are positioned further keystroke distances away from the selected character.

13. The system of claim 9, the display device configured to present, in response to the user deleting a selected character, a previous reconfigured dynamic keyboard.

14. A method for searching content using a configurable keyboard, the method comprising:
selecting, via a remote control device, a character on a configurable keyboard displayed on a monitor;
configuring the configurable keyboard around a selected character;
configuring the configurable keyboard with ordered selectable characters, wherein higher ordered selectable characters are minimal keystrokes from the selected character;
positioning a clear key a minimal keystroke distance from the ordered selectable characters; and
displaying the configurable keyboard on the monitor for a next character selection.

15. The method of claim 14, further comprising:
determining, by at least one of a service provider and a content provider, the ordered selectable characters based on historical patterns, genre, time, location, date, trends, release date, ratings, reviews, and user centric information or profile.

16. The method of claim 15, wherein how many ordered selectable characters are displayed is configurable.

17. The method of claim 15, further comprising:
positioning a backspace key a minimal keystroke distance from the ordered selectable characters.

18. The method of claim 17, further comprising:
returning to a previous presented configurable keyboard upon deletion of a selected character using the backspace key.

* * * * *